US012643425B2

(12) United States Patent
Cui et al.

(10) Patent No.: US 12,643,425 B2
(45) Date of Patent: Jun. 2, 2026

(54) DC METER FOR ELECTRICAL VEHICLE CHARGING STATION

(71) Applicant: Accuenergy (Canada) Inc., Toronto (CA)

(72) Inventors: Shaohang Cui, Toronto (CA); Ketao Li, Toronto (CA); Yufan Wang, Toronto (CA); Liang Wang, Toronto (CA)

(73) Assignee: Accuenergy (Canada) Inc., Toronto (CA)

( * ) Notice: Subject to any disclaimer, the term of this patent is extended or adjusted under 35 U.S.C. 154(b) by 365 days.

(21) Appl. No.: 18/337,309

(22) Filed: Jun. 19, 2023

(65) Prior Publication Data

US 2024/0416793 A1     Dec. 19, 2024

(51) Int. Cl.
*B60L 53/66* (2019.01)
*B60L 53/14* (2019.01)
*B60L 53/30* (2019.01)

(52) U.S. Cl.
CPC ............. *B60L 53/665* (2019.02); *B60L 53/14* (2019.02); *B60L 53/305* (2019.02)

(58) Field of Classification Search
CPC ....... B60L 53/665; B60L 53/14; B60L 53/305
See application file for complete search history.

(56) References Cited

U.S. PATENT DOCUMENTS

| | | | |
|---|---|---|---|
| 12,334,981 B2* | 6/2025 | Frankel | H04B 10/118 |
| 2009/0295370 A1* | 12/2009 | Parker | G01R 21/00 |
| | | | 324/140 R |
| 2011/0238341 A1* | 9/2011 | Etezadi-Amoli | B60L 53/63 |
| | | | 320/109 |
| 2022/0334156 A1* | 10/2022 | Balboni | B60L 53/62 |
| 2025/0096564 A1* | 3/2025 | Mirabian | H02J 3/06 |

FOREIGN PATENT DOCUMENTS

JP          2001298877 A  * 10/2001

* cited by examiner

*Primary Examiner* — Santosh R Poudel
(74) *Attorney, Agent, or Firm* — Michael D. Eisenberg; MDE Patents

(57) ABSTRACT
Provided is a DC meter for an electrical vehicle station. Specifically, the DC meter includes a first current input; a second current input; a voltage input; at least one analog-to-digital converter coupled to the first current input, the second current input and the voltage input, and configured for converting analog signal output from the current inputs and voltage input to digital data; at least one processing module coupled the at least one analog-to-digital converter, the at least one processing module is configured to: calculate the first current parameter through the first current input; calculate the second current parameter through the second current input; calculate the voltage parameter from the voltage input; compute a first energy consumption according to the first current parameter and the voltage parameter; compute a second energy consumption according to the second current parameter and the voltage parameter.

11 Claims, 4 Drawing Sheets

200

DC METER FOR ELECTRICAL VEHICLE CHARGING STATION

FIELD OF THE INVENTION

The present disclosure generally relates to a Direct Current (DC) meter for electrical vehicle charging stations, more specifically, to a DC meter with two current inputs and one voltage input.

BACKGROUND

The development of a charging infrastructure is necessary for the widespread adoption of electric vehicles (EVs). Accurate measurement of energy consumption and secure billing for consumers are critical components of any charging operation.

Typically, DC meters used in fast charging stations have one current input and one voltage input, which are used to measure the energy consumption of a single EV connector. This can be a costly solution.

It would be desirable to have a DC meter with one voltage input and two current inputs, which could be used to measure the energy consumption of two adjacent EV connectors at the same time.

SUMMARY OF THE INVENTION

The embodiments of the present disclosure generally related to DC meter for an electrical vehicle station.

In some embodiments, the present disclosure provides a DC meter. the DC meter includes a first current input; a second current input; a voltage input; at least one analog-to-digital converter coupled to the first current input, the second current input and the voltage input, and configured for converting analog signal output from the current inputs and voltage input to digital data; at least one processing module coupled the at least one analog-to-digital converter, the at least one processing module is configured to: calculate the first current parameter through the first current input; calculate the second current parameter through the second current input; calculate the voltage parameter from the voltage input; compute a first energy consumption according to the first current parameter and the voltage parameter; compute a second energy consumption according to the second current parameter and the voltage parameter.

These and other features and aspects of the present disclosure will become fully apparent from the following detailed description of exemplary embodiments, the appended claims and the accompanying drawings.

DETAILED DESCRIPTION

Embodiments of the present disclosure will be described herein with reference to the accompanying drawings. In the following descriptions, well-known functions or constructions are not described in detail to avoid obscuring the present disclosure. The word "exemplary" is used herein to mean "serving as an example." Any configuration or design described herein as "exemplary" is not to be construed as preferred, or advantageous, over other configurations or designs. Herein the phrase "coupled" is defined as "directly connected to or indirectly connected with" one or more intermediate components. Such intermediate components may include both hardware and software-based components.

It is further noted that, unless otherwise indicated, all functions described herein may be implemented in either software, hardware, or some combination thereof.

It should be recognized that the present disclosure can be performed in numerous ways, including as a process, an apparatus, a system, a method, or a computer-readable medium such as a computer storage medium.

Figure 1:
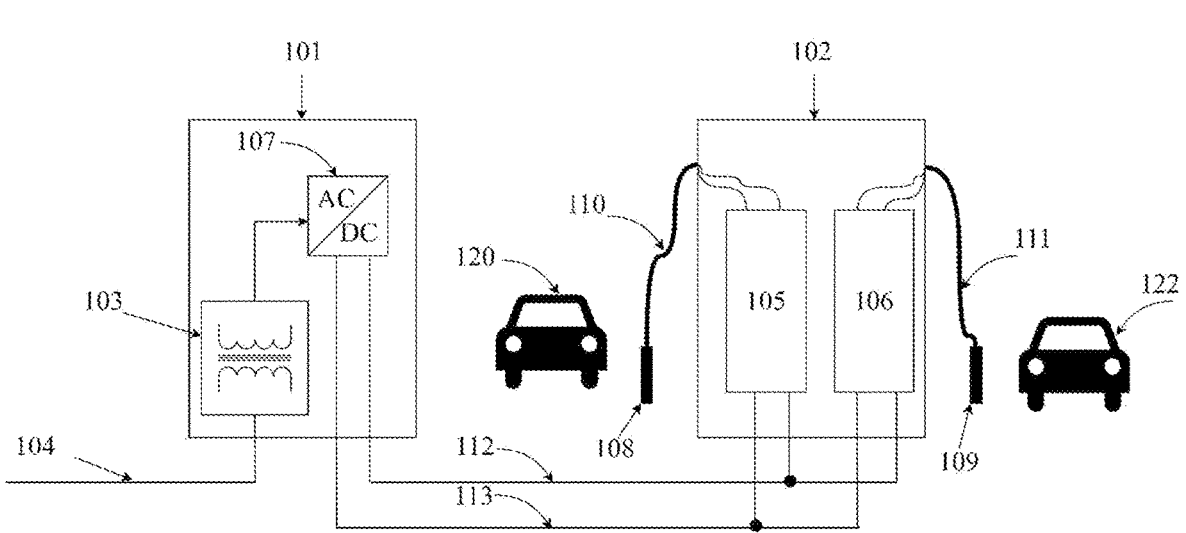
FIG. 1 is a schematic illustration of a conventional EV charging system with two DC meters.

FIG. 1 is a schematic illustration of a conventional EV charging system 100 with two DC meters 105 and 106. The EV charging system 100 includes an EV charger 101 and an EV post 102. The EV charger 101 includes a transformer 103 coupled to an AC-DC converter 107. The EV charger 101 receives AC electricity from AC grid 104 and then increase or decrease the voltage of AC electricity through the transformer 103. Then the transformed electricity is received by the AC-DC converter 107 to convert the AC electricity to DC electricity. The DC electricity is provided to EV post 102 through DC bus 112 and DC bus 113. EV connectors 108 can charge EV 120 and EV connector 109 can charge EV 122 at the same time. DC meter 105 measures the electricity consumption of the EV 120 coupled to EV connector 108. DC meter 106 measures the electricity consumption of the EV 122 coupled to EV connector 109. Charging cables 110 and 111 are connected to EV post 102, allowing for convenient charging of EVs.

The problem with this well-known charging system 110 is that two separate DC meters are used to measure electricity consumption of two EVs, although the EV connector 109 and EV connector 108 share the same voltage.

Figure 2:
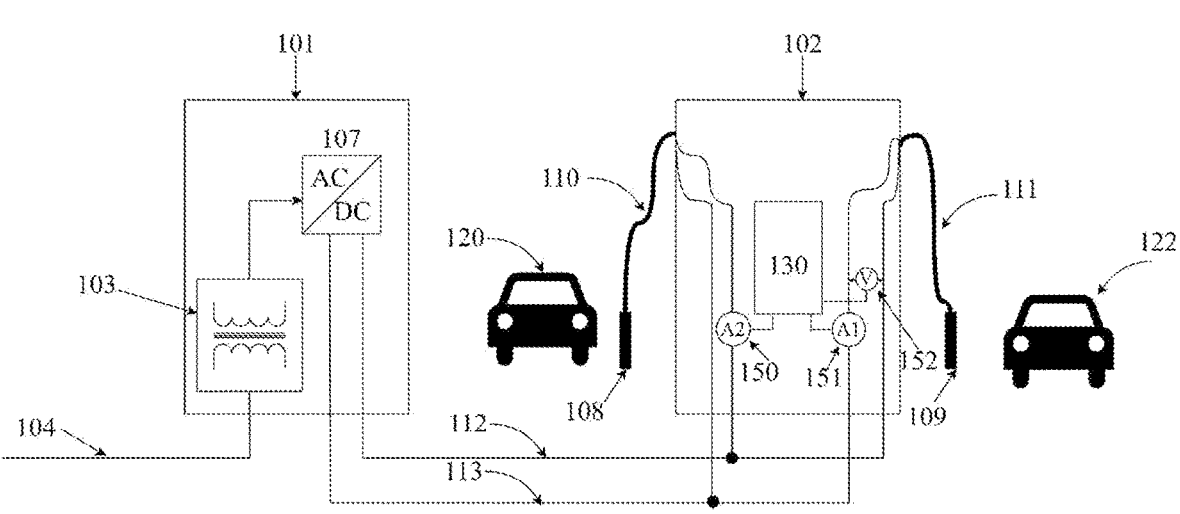
FIG. 2 is a schematic illustration of an EV charging system with one DC meter according to some embodiments.

FIG. 2 is a schematic illustration of an EV charging system 200 with one DC meter 130 according to some embodiments. The EV charging system 200 partly corresponds to the conventional EV charging system 100. In order to avoid repetition, reference is made to the above description, whereby the same reference signs are used for corresponding details.

The DC meter 130 can measure the electricity consumption of EV 120 and electricity consumption of EV 122 at the same time. The electricity consumption of EV 120 can be calculated by the current value measured by a current transformer 150 and the voltage value measured by potential transformer 152. The electricity consumption of EV 122 can be calculated by the current value measured by current transformer 151 and the voltage value between bus 112 and bus 133 measured by potential transformer 152. In some embodiments, the DC meter 130 can measure the current values and the voltage values directly without the current transformer 150, the current transformer 151, and the potential transformer 152.

Figure 3:
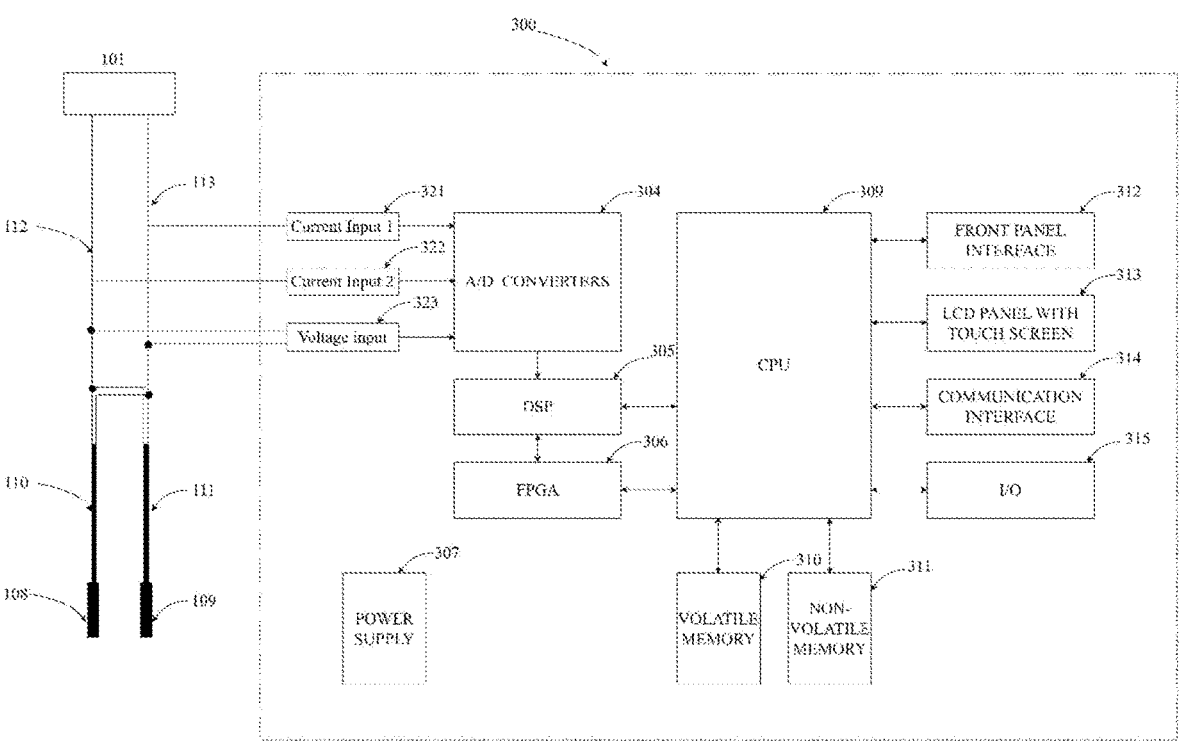
FIG. 3 is a block diagram of a DC meter for monitoring energy usage for EV charging.

FIG. 3 is a block diagram of an DC meter 300 for monitoring energy usage for EV charging.

The DC meter 300 illustrated in FIG. 3 includes two current inputs (current input 321 & current input 322), and one voltage input 323. The current input 321 is used to connect the current signal bus 113 with ADC 304. The current input 322 is used to connect the current signal from bus 112 with ADC 304. The voltage input 323 is used to connect the voltage signal from bus 112 with ADC 304. In some embodiments, the current input 321 can wire with bus 113 directly. In other embodiments, the current input 321 can also wire with bus 113 using shunt or Hall Effect sensor (Not shown in FIG. 3). In some embodiments, the voltage input 323 can wire with bus 112 and 113 directly. The voltage input 323 can also wire with bus 112 and 113 using shunt or Hall Effect sensor (Not shown in FIG. 3).

The DC meter 300 also includes multiple analog-to-digital (AID) converters 304, a power supply 307, volatile memory 310, non-volatile memory 311, a front panel interface 312, and a processing module that includes at least one Central Processing Unit (CPU) and/or one or more Digital Signal Processors (DSP), two of which are shown DSP 305 and CPU 309. The DC meter 300 also includes a Field Programmable Gate Array (FPGA) 306 which performs several functions, including acting as a communications bridge for transferring data between the various processors (305 and 309).

The outputs of each current input 321, current input 322 and voltage input 323 will be coupled with the A/D converters 304 which are configured to convert the analog output to a digital signal that can be processed by the DSP 305.

A/D converters 304 are configured to convert an analog output to a digital signal that is transmitted to a gate array, such as Field Programmable Gate Array (FPGA) 306. The digital signal is then transmitted from the FPGA 306 to the CPU 309.

The CPU 309 or DSP Processors 305 are configured to receive digital signals from the A/D converters 304 and perform the necessary calculations to determine power usage and control the overall operations of the DC meter 300. In some embodiments, the CPU 309 and DSP 305 may be combined into a single processor to serve the functions of each component. In some embodiments, it is contemplated to use an Erasable Programmable Logic Device (EPLD), a Complex Programmable Logic Device (CPLD), or any other programmable logic device in place of the FPGA 306. In some embodiments, the digital samples, which are output from the A/D converters 304 are sent directly to the CPU 309, effectively bypassing the DSP 305 and the FPGA 306 as a communications gateway.

The power supply 307 provides power to each component of the DC meter 300. In one embodiment, the power supply 307 is a transformer with its primary windings coupled to the incoming power distribution lines to provide a nominal voltage at its secondary windings. In other embodiments, power may be supplied from an independent power source to the power supply 307.

In FIG. 3, the front panel interface 312 is shown coupled to the CPU 309 which includes indicators, switches, and various inputs.

In FIG. 3, the LCD panel with touchscreen 313 is shown coupled to the CPU 309 for interacting with a user and for communicating events, such as alarms and instructions. The LCD panel with touchscreen 313 may provide information to the user in the form of alpha-numeric lines, computer-generated graphics, videos, animations, etc.

An input/output (I/O) interface 315 may be provided for receiving externally generated inputs from the DC meter 300 and for outputting data, such as serial data, to other devices. In one embodiment, the I/O interface 315 may include a connector for receiving various cards and/or modules that increase and/or change the functionality of the DC meter 300.

The DC meter 300 also includes volatile memory 310 and non-volatile memory 311. The volatile memory 310 will store the sensed and generated data for further processing and for retrieval when requested to be displayed at the DC meter 300 or from a remote location. The volatile memory 310 includes internal storage memory, such as Random-Access Memory (RAM). The non-volatile memory 311 includes removable memory, such as magnetic storage memory, optical storage memory (such as various types of CD or DVD media), solid-state storage memory, (such as a CompactFlash card, a Memory Stick, SmartMedia card, MultiMediaCard [MMC], SD [Secure Digital] memory), or any other memory storage that exists currently or will exist in the future. Such memory will be used for storing historical trends, waveform captures, event logs (including time-stamps), and stored digital samples for later download to a client application, webserver, or PC application.

In a further embodiment, the DC meter 300 will include a communication interface 114, also know as a network interface, for enabling communications between the meter, and a remote terminal unit or programmable logic controller and other computing devices, microprocessors, desktop computers, laptop computers, other meter modules, etc. The communication interface 314 may be a modem, Network Interface Card (NIC), wireless transceiver, or other interface. The communication interface 314 will operate with hardwired and/or wireless connectivity. A hardwired connection may include, but is not limited to, physical cabling (such as parallel cables serial cables, RS232, RS485, USB cables, or Ethernet) and an appropriately configured communication port. The wireless connection may operate under any of the various wireless protocols including, but not limited to, Bluetooth™ interconnectivity, infrared connectivity, radio transmission connectivity (including computer digital signal broadcasting and reception commonly referred to as Wi-Fi or 802.11.X [where x denotes the type of transmission]), satellite transmission, or any other type of communication protocols, communication architecture, or systems currently existing or to be developed for wirelessly transmitting data.

The DC meter 300 may communicate to a server or other computing device via the communication interface 114. The DC meter 300 may be connected to a communications network (such as the Internet) by any means. For example, a hardwired or wireless connection, such as dial-up, hard-wired, cable, DSL, satellite, cellular, PCS, or wireless transmission (e.g., 802.11a/b/g) may be used. It is noted that the network may be a Local Area Network (LAN), Wide Area Network (WAN), the Internet, or any network that couples multiple computers to enable various modes of communication via network messages. Furthermore, the server will communicate using various protocols, such as Transmission Control Protocol/Internet Protocol (TCP/IP), File Transfer Protocol (FTP), or Hypertext Transfer Protocol (ITTP) or via secure protocols such as Hypertext Transfer Protocol Secure (HTTPS), Internet Protocol Security Protocol (IP-Sec), Point-to-Point Tunneling Protocol (PPTP), Secure Sockets Layer (SSL) Protocol, or via other secure protocols. The server may further include a storage medium for storing the data received from at least one meter and/or storing data to be retrieved by the meter.

In an additional embodiment, when a power event occurs, such as a voltage surge, voltage sag, or current short circuit, the DC meter 300 may also have the capability of not only digitizing waveforms but storing the waveform and transferring that data upstream to a central computer, such as a remote server. The power event may be captured, stored to memory (e.g., non-volatile RAM), and additionally transferred to a host computer within the existing communication infrastructure either immediately, in response to a request from a remote device or computer, or later in response to a polled request. The digitized waveform will also allow the CPLT 309 to compute other electrical parameters such as harmonics, magnitudes, symmetrical components, and phasor analysis.

In a further embodiment, the DC meter 300 will execute an e-mail client and will send notification e-mails to the utility or directly to the customer when a power quality event occurs. This allows utility companies to dispatch crews to repair the condition. The data generated by the meters is used to diagnose the cause of the condition. The data is transferred through the infrastructure created by the electrical power distribution system. The e-mail client will utilize POP3 or another standard e-mail protocol.

The techniques of the present disclosure can be used to automatically maintain program data and provide field-wide updates upon which DC meter firmware and/or software can be upgraded. An event command can be issued by a user, on a schedule, or through a digital communication that will trigger the DC meter 300 to access a remote server and obtain the new program code. This will ensure that program data will be maintained, assuring the user that all information is displayed identically on all units.

It is to be understood that the present disclosure may be implemented in various forms of hardware, software, firmware, special purpose processors, or a combination thereof. The DC meter 300 also includes an operating system and application programs. The various processes and functions described herein may either be part of an application program (or a combination thereof) which is executed via the operating system.

Because some of the system components and methods depicted in the accompanying figures may be implemented using either software or firmware, it is to be further understood that the actual connections between the system components (or the process steps) may differ depending on the specific way the present disclosure is programmed. Given the teachings of the present disclosure provided herein, one of ordinary skill in the related art will be able to contemplate these and similar implementations or configurations of the present disclosure.

Figure 4:
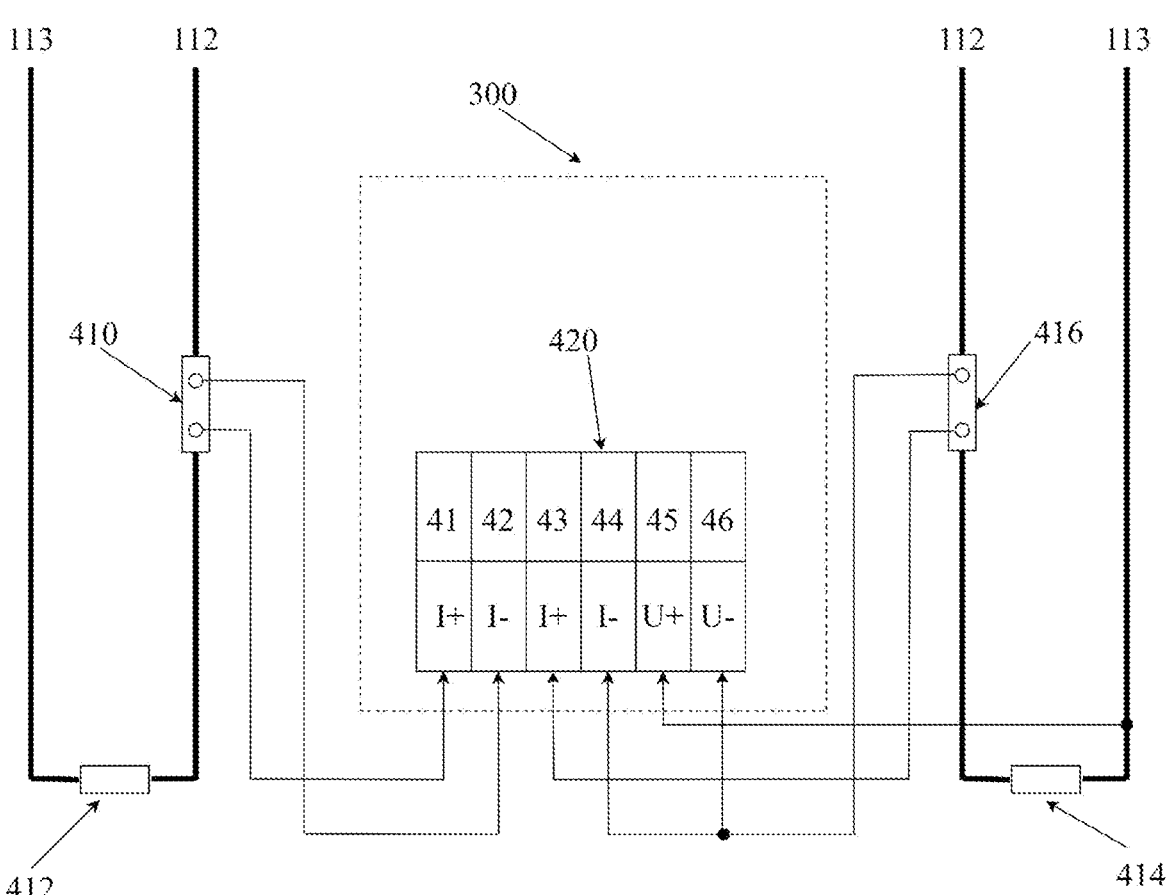
FIG. 4 is an exemplary wiring diagram of one DC meter according to some embodiments.

FIG. 4 is an exemplary wiring diagram of the DC meter 300 according to some embodiments. In FIG. 4, voltage and current wiring is implemented using shunt 410 and shunt 416. In DC meter 300, there is a voltage-current terminal strip 420. The voltage-current terminal strip 420 includes some terminals such as current terminal 41(I+), current terminal 42(I−), current terminal 43(I+), current terminal 44(I−), voltage terminal 45(U+) and voltage terminal 46(U−). The current terminal 41 and current terminal 42 are part of the current input 321. The current terminal 43 and current terminal 44 are part of the current input 322. In FIG. 4, the load 412 is the equivalent resistance of EV 120. The load 414 is the equivalent resistance of EV 122. It can be observed that DC meter 300 can measure electricity consumption of two EV 120 and EV 122 at the same time.

Embodiments of the teachings of the present disclosure have been described in an illustrative manner. It is to be understood that the terminology, which has been used, is intended to be in the nature of words of description rather than of limitation. Many modifications and variations of the embodiments are possible in light of the above teachings. Therefore, within the scope of the appended claims, the embodiments can be practiced other than specifically described.

6

What is claimed is:

1. A direct current (DC) meter for an electrical vehicle station, the DC meter comprising:
   a first current input;
   a second current input;
   a voltage input;
   at least one analog-to-digital converter coupled to the first current input, the second current input and the voltage input, and configured to convert analog signals from the current inputs and the voltage input into digitized data;
   at least one processing module comprising a digital signal processor (DSP), a field-programmable gate array (FPGA), and a central processing unit (CPU), the processing module being coupled to the at least one analog-to-digital converter and configured to:
   generate a first current parameter corresponding to the digitized data of the first current input;
   generate a second current parameter corresponding to the digitized data of the second current input;
   generate a voltage parameter corresponding to the digitized data of the voltage input;
   compute a first energy consumption according to the first current parameter and the voltage parameter;
   compute a second energy consumption according to the second current parameter and the voltage parameter; and
   output timestamped energy consumption data for each of two separate electric vehicle connectors using the common voltage input
   wherein the field programmable gate array (FPGA) configured to transfer digitized data between the at least one analog-to-digital converter and the processing module;
   wherein the DSP is configured to perform digital filtering of the digitized signals prior to energy computation.

2. The DC meter of claim 1, wherein the at least one processing module is further configured to:
   determine a total energy consumption by summing the first energy consumption and the second energy consumption; and store the total energy consumption in non-volatile memory for billing purposes.

3. The DC meter of claim 1, further comprising a power supply configured to provide isolated power to the at least one analog-to-digital converter and the processing module.

4. The DC meter of claim 1, wherein the DC meter further comprises non-volatile memory configured to store timestamped energy consumption data, waveform captures, and event logs associated with power quality events.

5. The DC meter of claim 1, wherein the processing module is configured to record historical energy consumption trends and transfer the data to a remote server.

6. The DC meter of claim 1, further comprising a communication interface selected from the group consisting of Ethernet, RS485, USB, and wireless transceivers, the communication interface being configured to transmit billing data to a remote computing device.

7. The DC meter of claim 6, wherein the communication interface is configured to transmit a notification in response to detection of a power quality event.

8. The DC meter of claim 1, wherein the DC meter is configured to simultaneously measure and report energy consumption for two electric vehicle connectors using a common voltage input.

9. The DC meter of claim 8, wherein the processing module is configured to generate separate billing records for each of the two electric vehicle connectors.

10. The DC meter of claim 1, wherein the processing module is further configured to compute harmonics, phasor components, or power quality indices based on the digitized signals.

11. The DC meter of claim 1, wherein the DC meter is configured to capture waveform data during a voltage surge, voltage sag, or current short circuit and transfer the waveform data to a remote computing device.

* * * * *